United States Patent
Ambrosius

[15] 3,705,745
[45] Dec. 12, 1972

[54] VEHICLE SEAT
[72] Inventor: Manfred Ambrosius, Langenfeld-Richrath, Germany
[73] Assignee: Bremshey & Co., Solingen-Ohligs, Germany
[22] Filed: Sept. 16, 1968
[21] Appl. No.: 762,219

[30] Foreign Application Priority Data
Sept. 14, 1967 Germany..................P 16 30 164.9

[52] U.S. Cl. ...................297/308, 297/345, 248/399
[51] Int. Cl. ..............................................B60n 1/02
[58] Field of Search..............297/307, 308, 345, 304; 248/399, 378, 403, 402

[56] References Cited
UNITED STATES PATENTS

| | | | |
|---|---|---|---|
| 1,150,259 | 8/1915 | Epley | 248/402 |
| 1,562,658 | 11/1925 | Presley | 297/308 |
| 1,767,757 | 6/1930 | Harris | 297/307 |
| 1,770,321 | 7/1930 | Mougeotte | 297/307 |
| 1,905,588 | 4/1933 | Harris | 297/308 |
| 2,432,554 | 12/1947 | Knoedler | 248/399 |
| 2,550,170 | 4/1951 | Spiess | 297/308 |
| 2,840,140 | 6/1958 | Harrington | 248/378 |
| 2,928,639 | 3/1960 | Shelly | 248/403 |
| 2,991,970 | 7/1961 | White et al. | 248/378 |

Primary Examiner—Francis K. Zugel
Attorney—Ernest G. Montague

[57] ABSTRACT

A vehicle seat with endless adjustment of the resilient means of the seat rigidly connected with the back of the seat, which comprises a spring leg disposed on the back of the seat and continuously adjustable as to its inclination with length variations. A stationary seat frame includes guide rails for guiding the back of the seat by means of three pairs of rollers, and comprising first guide means arranged in longitudinal direction of the seatframe receiving and guiding two lateral of the pairs of rollers, the first guide means restraining movement of the seat in the direction of movement of the vehicle and second guide means receiving had guiding the third and central of pairs of rollers, the second guide means restraining movement of the seat in the transverse direction

4 Claims, 7 Drawing Figures

PATENTED DEC 12 1972

INVENTOR.
Manfred Ambrosius
BY Ernest G. Montague
Attorney

VEHICLE SEAT

The present invention relates to a vehicle seat with endless adjustment of the spring of the seat rigidly connected with the back of the seat.

It is known in resilient vehicle seats particularly for working vehicles, as for instance for tractors and the like, to pivotally connect the seat frame carrying the seat cushions, or the seat receiver by means of a pivotal guide on a carrying frame and to support the same by an elastic member, as well as by a shock absorber.

In a known embodiment, rollers have been provided which were secured to the frame of the back of the seat, which rollers run in a rearwardly inclined guide rod. The provided elastic members are formed as rubber pulls which, however, cannot be adjusted as to their carrying force in the required wide limits. Also, by the guide, so-called pitch swingings of the seat result which are strongly tiring and, in accordance with a latest investigation, are damaging to the health of the user of the vehicle.

It is one object of the present invention to provide a vehicle seat which avoids the drawbacks of the prior structure.

It is another object of the present invention to provide a vehicle seat, wherein in simplest manner and with the avoidance of swingings, only one degree of freedom of the seat spring is obtained, which results in a linear movability of the seat and makes possible the endless setting of the spring.

It is still another object of the present invention to provide a vehicle seat, wherein the back of the seat, loaded by a spring leg disposed on the back side and settable as to its inclination with length variations, is guided on rails by means of three pairs of rollers on the seat frame, whereby the two lateral pairs of rollers run in guides supported in longitudinal direction of the seat and the center pair of rollers runs in guides supporting in the cross direction of the seat.

Due to this arrangement, the use and the incorporation of the spring leg reliably settable to a desired variable carrying capacity and consisting of helical springs, is made possible. An advantageous easily responding linear straight guide of the seat and a safe disturbance-free operation is obtained.

A simple, favorable structure of this embodiment is brought about by the present invention such, that the lateral guides are formed by inwardly open double edges of the frame back wall, which in its center range is equipped with angular-shaped guide rails for the center pair of rollers.

In order to bring about a progressive spring effect with the settable spring leg, in accordance with the present invention, two pressure springs are disposed coaxially relative to each other, which support themselves, on the one hand, on the joint counter bearing disposed on the foot side and of which the inner shorter spring is arranged in two telescopically displaceable tubes, which extend inside of the outer longer spring, which enters an additional outer telescope tube and supports itself against its bottom.

In order to bring about an advantageous far reaching adjustment range of the spring effect, the upper end of the spring leg secured at the side of the back seat is coupled with a spindle nut, the spindle of which, mounted on the back of the seat, extends in cross direction of the seat inclined to the horizontal such, that the lower spindle section is arranged about perpendicularly above a foot side arranged pivotal point of the spring leg.

With these and other objects in view, which will become apparent in the following detailed description, the present invention will be clearly understood in connection with the accompanying drawings, in which.

Figure 1:
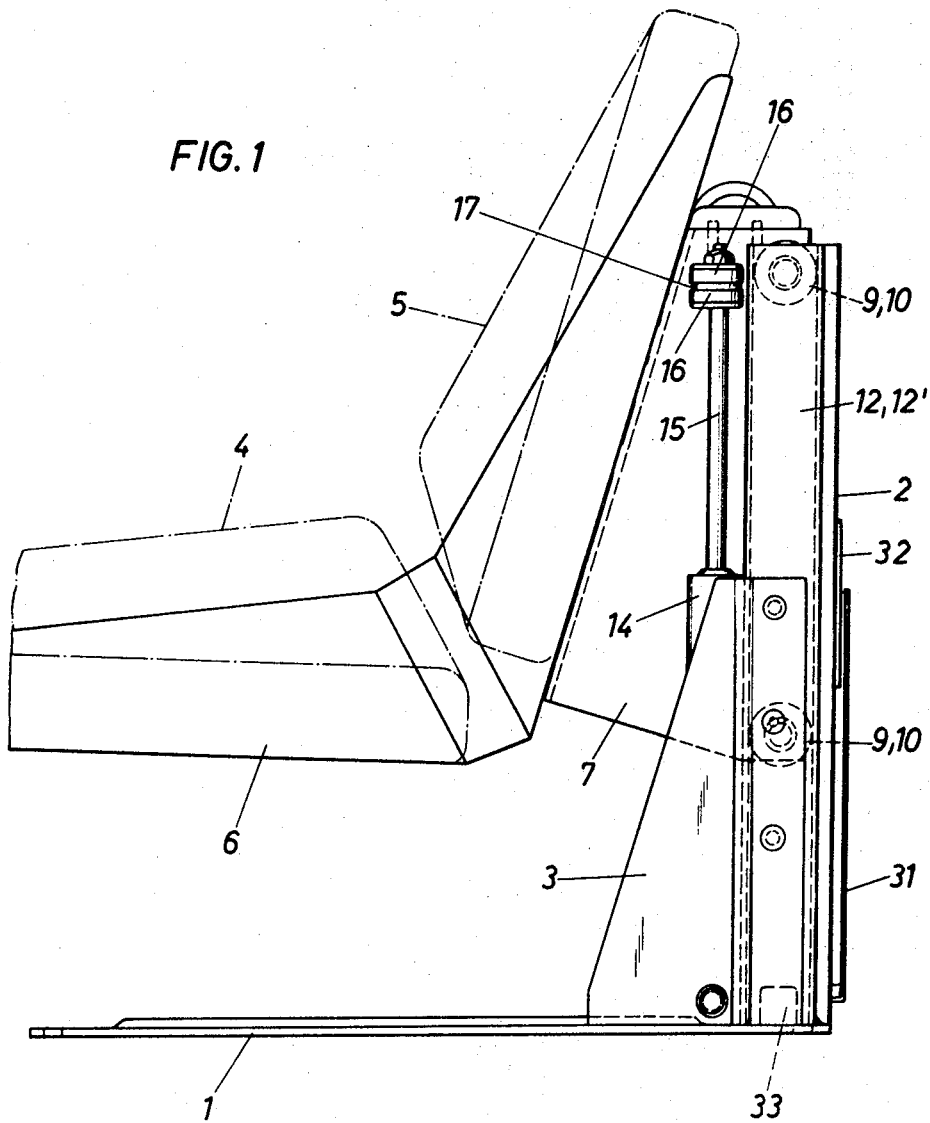
FIG. 1 is a side elevation of the vehicle seat, designed in accordance with the present invention.
Figure 2:
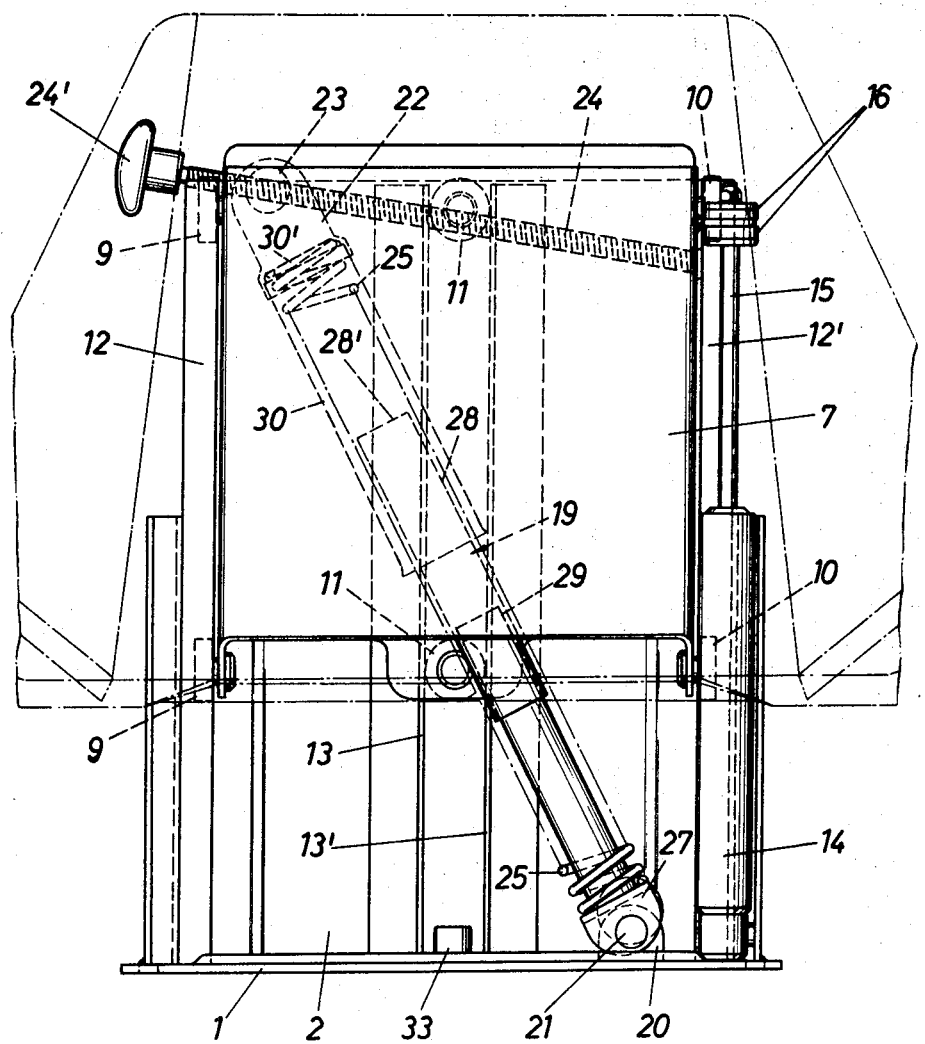
FIG. 2 is a front elevation of the vehicle seat.
Figure 3:
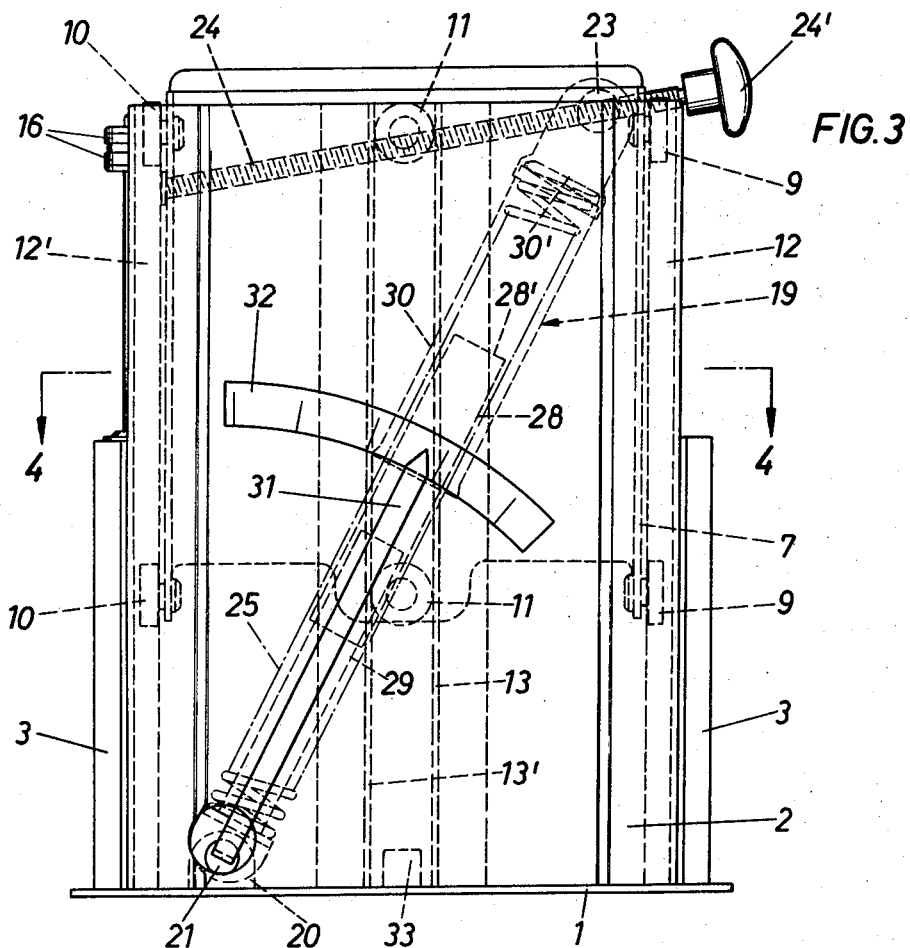
FIG. 3 is a rear elevation thereof.
Figure 4:
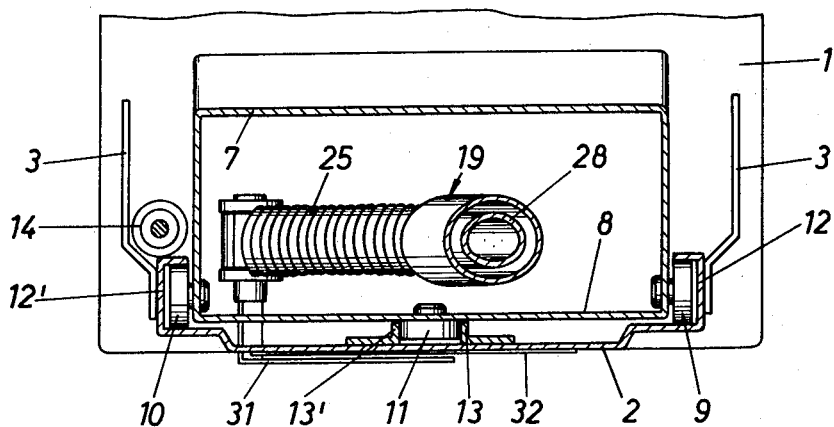
FIG. 4 is a section along the lines 4—4 of FIG. 3.
Figure 5:
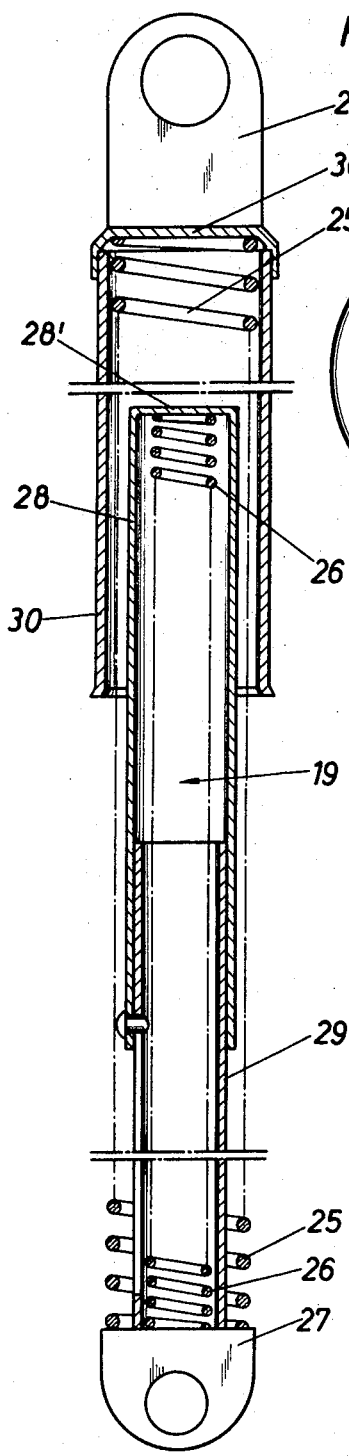
FIG. 5 is a longitudinal section through the spring leg.
Figure 6:
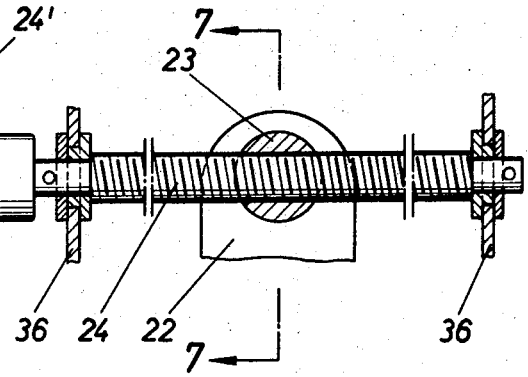
FIG. 6 is a longitudinal elevation of the setting spindle partly shown in section.
Figure 7:
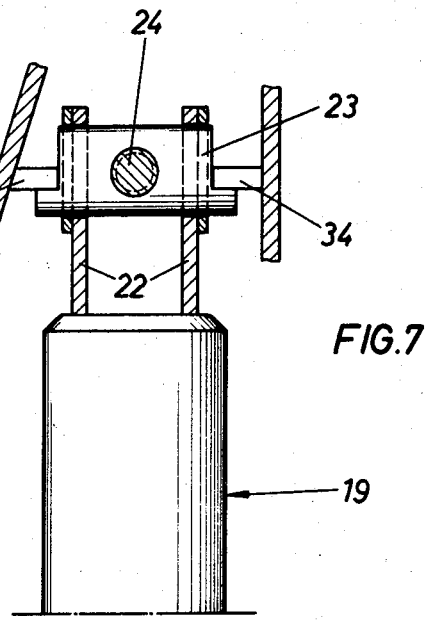
FIG. 7 is a section along the lines 7—7 of FIG. 6.

Referring now to the drawings, the seat frame comprises a base plate 1 on which substantially vertically a back wall 2 of the seat frame is rigidly secured by means of a gusset plate 3.

A seat cushion 4 and a back cushion 5 are disposed in a form stiff seating receiver 6. On the back of the seat receiver 6 is secured a box-shaped seat cushion carrier 7, on which lateral pairs of rollers 9 and 10, respectively, are provided. Furthermore, on the back wall 8 of the carrier 7 is arranged a central pair of rollers 11.

The back wall 2 of the seat frame is equipped with lateral guides 12 and 12' which are formed by inwardly open double-edge formations of the back wall 2 of the frame, so that U-shaped guide rails fitting the rollers 9 and 10 are created.

At its center range, the suitably curved back wall 2 of the seat frame is equipped with angle-formed, vertical guide rails 13 and 13' extending parallel to each other and to the guides 12 and 12' for the center pair of rollers 11, the guide rails 13 and 13' constituting a guide slit therebetween.

On the box-shaped carrier 7, the push rod 15 of a shock absorber 14 grips by means of a holding angle 17 supported by rubber buffers 16, which shock absorber 14 is secured to the base plate 1.

A spring leg 19 projects through the inner space of the carrier 7 which is pivotally connected to the base plate 1 by means of a swinging pin 21 retained by blocks 20. The upper end of the spring leg 19, formed as a fork 22, is coupled with a spindle nut 23, the spindle 24 of which, mounted on the back and in the carrier 7, respectively, extends inclined to the horizontal such, that the lower spindle section is substantially perpendicular above the foot side pivot point of the spring leg.

The spindle 24 can be operated by means of a rotary knob 24', so that the spindle nut 23 reciprocates along the spindle, whereby with length variations of the spring leg 19 settable as to its inclination, the latter is disposed vertically in one end position.

The spring leg 19 has two pressure springs 25 and 26 which support themselves in the joint, foot sided counter bearing 27. The outer longer pressure spring 25 supports itself against the fork 22 and carries therefore the resiliently supported seat 4, 5 and 6 guided with a vertical degree of freedom by means of the guides 12 and 12', 13 and 13', and the pairs of rollers 9, 10 and 11, respectively.

The inner shorter measured pressure spring 26 is disposed in two tubes 28 and 29 telescopically displaceable relative to each other, which tubes 28 and 29 extend inside of the outer longer pressure spring 25. The latter enters in an additional outer telescope tube 30 and supports itself against the bottom 30'.

On the swinging pin 21 is provided a pointer 31 guided outwardly towards the back wall 2 of the seat frame, the pointer point of which swings over a setting scale 32 provided on the rear face of the seat frame.

From the greater or lesser inclination position of the spring leg 19 by means of the spindle 24 results an endless adjustment of the spring of the seat 4, 5 and 6 rigidly connected with the carrier 7. A resiliency occurring during the loading of the seat is at first provided by the pretensioned other pressure spring 25 by previous setting of the inclination adjustable spring leg 19 corresponding to the weight of the person using the seat. Stronger spring deflections, for instance during travel by jolts, cause a setting down of the bottom 30' of the telescopic tube 30 on the end face 28' of the telescope tube 28, whereby additionally the shorter inner spring 26 is put into operation.

During such resilient swinging of the seat, the shock absorber 14 operates in known manner, absorbing onto the straight running spring.

At the lower ends of the guides 12, 12' and 13, 13' rubber cushions 33 can be provided for the jolt reducing limiting of the spring of the seat resiliency.

The inclination adjustment of the spring leg not only changes the spring counter force due to different components of the effect, but also due to appreciable varied spring pretension.

The spindle nut 23 supports itself on rails 34 and 35 which run in parallel direction to the spindle 24, and on which also sit the bearing sheets 36 for the spindle 24.

I claim:

1. A seat for vehicles, comprising,
   a back of a seat,
   a seat cushion carrier rigidly connected with said back of said seat,
   a stationary seat frame,
   guide roller means mounting displaceably said seat in a vertical direction,
   a carrier spring means supporting said seat and comprising a coil spring containing an inclination variable and length variable spring leg, the latter having a lower foot side,
   a swinging pin connecting said spring leg at said foot side with said seat frame,
   a spindle mounted on said seat cushion carrier,
   a spindle nut operatively disposed on said spindle,
   said spring leg pivotally connected at its upper end with said spindle nut, and
   said spindle defining a lower spindle section, said spindle extending inclined to the horizontal in a direction transverse to said seat, such that said lower spindle section is disposed approximately vertically above said foot sided swinging pin of said spring leg.

2. The vehicle seat, as set forth in claim 5, wherein
   said guide roller means comprises three roller pairs provided on said seat cushion carrier, the latter carrying said spindle,
   first guides,
   two of said three roller pairs running in said first guides, the latter restraining said seat in the direction of movement of said vehicle,
   a second guide arranged between said first guides, and
   the third of said roller pairs running in said second guide, the latter restraining said seat in the transverse direction.

3. The seat, as set forth in claim 6, wherein
   said frame includes a back wall,
   said first guides comprise lateral guides including inwardly open double-edge formations of said back wall of said frame operatively connected with said seat cushion carrier, and
   said second guide comprises angle-formed guide rails equipped on said back wall of said frame in its center range for said third roller pair, the latter constituting a middle pair of said three roller pairs, and said angle-formed guide rails restraining from movement in the transverse direction.

4. The vehicle seat, as set forth in claim 5, wherein
   said spring leg comprises an inner shorter pressure spring and an outer longer pressure spring disposed coaxially relative to each other,
   a joint foot sided counter bearing supporting one end of said springs,
   two tubes telescopically displaceable relative to each other and receiving said inner shorter of said pressure springs,
   said two tubes extend inside of said outer longer of said pressure springs,
   an additional outer telescopic tube having a bottom, and said outer longer pressure spring inserted in said additional outer telescopic tube and supported against said bottom of the latter.

* * * * *